(12) United States Patent
Turos

(10) Patent No.: US 7,600,453 B1
(45) Date of Patent: Oct. 13, 2009

(54) REFINISHING TOOL

(75) Inventor: Kenneth Turos, Las Cruces, NM (US)

(73) Assignee: Sun Systems, Inc., Las Cruces, NM (US)

( * ) Notice: Subject to any disclaimer, the term of this patent is extended or adjusted under 35 U.S.C. 154(b) by 198 days.

(21) Appl. No.: 11/516,415

(22) Filed: Sep. 6, 2006

Related U.S. Application Data

(63) Continuation-in-part of application No. 10/684,021, filed on Oct. 10, 2003, now abandoned.

(51) Int. Cl.
*B23B 27/16* (2006.01)
*B23B 27/00* (2006.01)

(52) U.S. Cl. .................. 82/1.11; 407/83; 407/105; 407/89

(58) Field of Classification Search ............ 407/81–84, 407/89, 90, 105; 82/1.11, 112, 158; *B23B 27/00, B23B 27/16*
See application file for complete search history.

(56) References Cited

U.S. PATENT DOCUMENTS

| | | | | |
|---|---|---|---|---|
| 1,032,898 A * | 7/1912 | Hane | ........................... | 407/82 |
| 1,219,097 A * | 3/1917 | Gibbs | ......................... | 407/79 |
| 1,282,984 A * | 10/1918 | Thompson | .................. | 407/89 |
| 1,435,288 A * | 11/1922 | Gifford et al. | ................ | 81/58.3 |
| 1,438,368 A * | 12/1922 | Dorrans | ........................ | 407/83 |
| 1,476,262 A * | 12/1923 | Marshall | ..................... | 407/80 |
| 2,160,369 A * | 5/1939 | Rikof | ............................ | 407/83 |
| 2,215,344 A * | 9/1940 | Albrecht | ..................... | 408/152 |
| 2,248,931 A * | 7/1941 | Anania | ......................... | 407/82 |
| 2,392,217 A * | 1/1946 | Anania | ......................... | 407/89 |
| 2,571,395 A * | 10/1951 | Vawter | ......................... | 408/82 |
| 3,148,561 A * | 9/1964 | Krampert | .................... | 408/181 |
| 3,500,523 A * | 3/1970 | Cashman et al. | ............... | 407/6 |
| 4,034,451 A * | 7/1977 | Kummer | ....................... | 407/90 |
| 4,057,884 A * | 11/1977 | Suzuki | ......................... | 407/89 |
| 4,097,181 A * | 6/1978 | Fisher | ......................... | 408/187 |
| 6,244,789 B1 * | 6/2001 | Tsuda | ......................... | 407/107 |
| 6,279,919 B1 * | 8/2001 | Turos | ......................... | 279/133 |
| 6,393,703 B1 * | 5/2002 | Wu | ............................. | 30/232 |
| 6,997,655 B2 * | 2/2006 | Robinson | .................... | 408/156 |
| 7,364,389 B2 * | 4/2008 | Robinson | .................... | 408/156 |

FOREIGN PATENT DOCUMENTS

EP 1145931 A1 * 10/2001

* cited by examiner

*Primary Examiner*—Boyer D Ashley
*Assistant Examiner*—Sara Addisu
(74) *Attorney, Agent, or Firm*—Ray R. Regan

(57) ABSTRACT

A tool for refinishing a workpiece such as a brake drum includes an arm for a user to grasp the refinishing tool during operation. A pivotal swivel member is connectable to the arm. The swivel member is formed with an asymmetrical shoulder for compressively and rigidly fixing the swivel member and arm in a fixed linear alignment coincident with a longitudinal axis through the arm and swivel member during a refinishing operation. The asymmetrical shoulder also orients the swivel member in any angular position within a continuous range between zero degrees and forty-five degrees in one direction from the fixed linear alignment. A coupler is formed in the arm and in the swivel member to removably connect the swivel member and the arm. A plurality of demountable locking devices is included for variably positioning the swivel member in relation to the arm. A cutter is detachably mountable on the swivel member, and is adapted to refinish the rotating workpiece on a lathe.

24 Claims, 8 Drawing Sheets

REFINISHING TOOL

CROSS-REFERENCE TO RELATED APPLICATION

This application is a continuation-in-part from a application Ser. No. 10/684,021, filed Oct. 10, 2003 now abandoned, entitled a REFINISHING TOOL ("Application"). The specification of the Application is incorporated by reference into this document.

FIELD OF TECHNOLOGY

The refinishing tool disclosed and claimed in this document pertains generally to the field of machine tools. More particularly, the new refinishing tool is useful for, among other uses, machining, refinishing, balancing, and re-surfacing (collectively, "refinishing") a rotating workpiece. The refinishing tool is particularly, but not exclusively, useful for refinishing a rotating workpiece such as a vehicle brake regardless of the size or dimensions of the brake.

BACKGROUND

Machines used to shape workpieces generally include a driving motor, a driven rotatable shaft on which a workpiece may be removably mounted, and retaining devices attachable to the shaft for demountably holding the workpiece. More particularly, the new and useful refinishing tool disclosed and claimed in this document is useful for refinishing a vehicular brake or flywheel mountable on a shaft or arbor of a brake lathe for refinishing operations on a vehicular brake (collectively, "brake").

One such workpiece is a motor vehicle brake, either a drum or disk (collectively, "brake"). Brakes become worn during use on vehicles. Worn brakes, however, may be machined, refinished, balanced, and resurfaced for subsequent re-use. Tools are available to reciprocally engage and shape surfaces of brake drums for re-use. Refinishing work has become increasingly difficult, however, because the size of brakes has diminished in recent years.

A brake, of course, is any mechanical device for arresting the motion of a wheel (and accordingly the vehicle) by means of friction. Kinetic energy is converted into heat energy through use of frictional forces applied to the wheels of the vehicle, causing the vehicle to slow or stop. A drum brake is a type of brake using a drum-shaped metal cylinder attached to the inner surface of the wheel of a motor vehicle and rotating within it. When the brake is applied, curved brake shoes with friction linings press against the drum's inner circumference to slow or stop the vehicle. The rotating part of a disc brake is also called a "rotor." The non-rotating, basically stationary, component of a disc brake system is a brake caliper that applies force from a hydraulic system to the rotor or disc to decelerate or stop a vehicle.

Brake fade is a condition brought about by repeated or protracted braking that results in reduced braking effectiveness ("fading"). Heat is the primary cause of fading, which in turn causes expansion and other undesirable thermal effects on a brake. Although disc brakes are less prone to fade because rotors are more effectively cooled by air moving across the brakes, and can be internally vented to increase resistance to fade, nevertheless persistent stop-and-start braking causes damage to any brake, whether a drum or rotor. Accordingly, a significant industry has developed in connection with the machining, refinishing, balancing and resurfacing of brake drums and rotors (collectively, "refinishing").

To refinish a brake, a drum or a rotor is mounted on a rotatable shaft or arbor of a brake lathe system. During operation, forces due to rotation and gravity tend to preclude uniform rotation of the rotating arbor on which a brake has been mounted. The arbor and devices mounted on the arbor for refinishing do not rotate in a single, unvarying plane of rotation. The forces acting on a rotating arbor and brake may distort in one or more planes and along one or more axes of rotation. The forces exert a variety of angular and planar forces that affect how accurately and quickly the brake lathe operator may work on a brake to refinish it.

In addition, forces and force vectors may induce harmonics and vibrations that may be transmitted to the arbor, brake and other components of the lathe. A non-uniform rotation of a brake during a refinishing operation may cause a cutting or refinishing tool brought into contact with a brake surface to produce an inferior surface.

To overcome such undesirable problems, the inventor named in this document has received a number of U.S. patents for apparatus and methods that resolve in exemplary fashion adverse consequences of such forces, thus improving the refinishing process, including U.S. Pat. No. 6,279,919B1 issued Aug. 28, 2001 for an Apparatus for Securing a Workpiece to a Rotatable Machine Member; U.S. Pat. No. 6,554,291B1 issued Apr. 29, 2003 for an Apparatus for Securing a Workpiece to a Rotatable Machine Member; U.S. Pat. No. 6,397,989B1 issued on Jun. 4, 2002 for an Apparatus for Reducing Harmonics and Vibrations of a Rotatable Base Piece; U.S. Pat. No. 6,631,660B1 issued Oct. 14, 2003, for a Self-Aligning Arbor Nut System. The inventor currently has pending a U.S. patent application for a Refinishing tool Ser. No. 10/684,021 filed on Oct. 10, 2003 ("Pending Application"), as well as application Ser. No. 11/365,733 for a Reversible Flange Plate filed on Mar. 1, 2006, and, as indicated above, application Ser. No. 11/376,271, entitled, Adapter Assembly for Hubbed Rotor filed on Mar. 15, 2006. The patents and application are collectively referred to in this document as the "Prior Patents and Applications" for ease of reference.

The apparatus disclosed and claimed in the Prior Patents and Applications have proven useful in a variety of situations and installations, and uniquely adapted for uses described in the Prior Patents and Applications. The apparatus disclosed and claimed in this document, however, is directed to refinishing a brake.

Tools available for refinishing a workpiece such as a brake include boring bars. Conventional boring bars include a unitary monolithically formed bar with a cutting or refinishing device (collectively, "cutter") attached to one end of the unitary bar. As the sizes of brakes have decreased, however, conventional unitary boring bars have proven unsuccessful in refinishing the smaller sized brakes on many brake lathe machines.

A craftsman seeking to insert a refinishing cutter attached to a conventional boring bar cannot insert the cutter into and against the smaller brakes. The cutter may not fit within the angle formed between the boring bar and the longitudinal axis through the center of the drum and the rotating shaft of a conventional brake lathe adapter or other apparatus holding a rotating brake drum.

Refinishing cutters attached to conventional boring bars cannot be positioned within the decreasing space between (a) a brake mounted on a brake lathe tool or adapter, and (b) the arbor shaft and an adapter that hold a brake during operation and performance of the refinishing work. The amount of travel, or adjustment, between a device designed to hold a boring bar during operation, and the boring bar itself, is limited as regards inboard movement and positioning, and therefore cannot vary to fit into a wide range of brakes.

Use of a variety of variously sized boring bars and refinishing cutters not only is too expensive, it also requires the craftsman performing the refinishing work to change boring bars depending on the size of the brake to be worked on, and therefore adds excessively to the cost of refinishing.

Therefore, a previously unaddressed need exists in the industry for a new, useful and improved apparatus, and method for using such an apparatus, that provides a variable angle refinishing tool and dimensionally variable shaper or cutter head capable of machining, refinishing, balancing, or resurfacing a brake drum regardless of the applicable size or dimensions of the brake drum.

While the apparatus disclosed and claimed in the Pending Application has proven useful for the intended situations and applications described in that document, additional improvements and optimizations shown and claimed in this document provide embodiments in which the different configurations described in this document result in additional and alternative uses for the hubbed rotor adapter plate described and claimed in this document.

SUMMARY

The tool for refinishing a workpiece such as a brake disclosed and claimed in this document includes an arm. The arm is adapted for a craftsman to grasp the refinishing tool during operation. In addition, a swivel member is provided. The swivel member is pivotally mountable on the arm. The swivel member is formed with a tongue that includes an asymmetrical shoulder. The asymmetrical shoulder is adapted to compressively rigidly fix the swivel member and arm in a fixed linear alignment coincident with a longitudinal axis through the arm and swivel member. The asymmetrical shoulder is further adapted to rotatably orient the swivel member in any angular position within a continuous range between zero degrees and forty-five degrees in one direction from the fixed linear alignment.

The tool for refinishing a workpiece such as a break disclosed and claimed in this document also includes a coupler. The coupler is formed in the arm and in the swivel member. The coupler is adapted to removably connect the swivel member and the arm. A plurality of adjustable and demountable locking devices is included. The plurality of demountable locking devices is adapted to variably position the swivel member in relation to the arm. A cutter is detachably mountable on the swivel member, and is adapted to refinish the rotating brake on a lathe.

As used in this document, the term "coupler" includes, in one embodiment, (i) a slot and two bar extensions formed in one end of the arm, (ii) a bore formed through each of the two bar extensions, and (iii) a tongue formed in one end of the swivel member that is removably and rotatably mountable in the slot formed between the two bar extensions of the arm. A hole is formed in the tongue. The tongue also includes an asymmetrical shoulder formed with a partially beveled edge. The partially beveled edge is positionable so that the partially beveled edge will make contact with a surface of the slot at a desired point in rotation of the swivel head in relationship to the arm, restricting further movement, thus contributing to locking the swivel member in a desired position during operation. A connector is provided for rotatable insertion through the bores and the hole for rotatable and removable connection of the swivel member and the arm. The cutter is removably connectable to the other end of the swivel member.

In another aspect and embodiment of the refinishing tool, the coupler of the refinishing tool includes a slot and two bar extensions formed in one end of the swivel member, a bore formed through each of the two bar extensions, and an arm shaped with a tongue at one end for removable mounting on the swivel member.

As will be evident to one skilled in the art, other aspects and embodiments of the refinishing tool are possible. The coupler of the refinishing tool may be practiced in a variety of manners and shapes allowing the arm and the swivel member to be removably and rotatably connectable, and to be locked into a desired position or attitude during operation.

As used in this document, the term "attitude" means the positioning of the cutter in relationship to a surface of a workpiece to be shaped during operation. Thus, the arm of the refinishing tool is removably mountable on a device for positioning the refinishing tool to perform refinishing work on a rotating workpiece (collectively, a "keeper"). The keeper is positionable adjacent an arbor, and allows a craftsman to insert the end of the swivel member holding the cutter within a rotating workpiece such as a brake drum to perform the refinishing work. The refinishing tool may be locked into variable desired positions and attitudes during operation.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the refinishing tool will become apparent to those skilled in the art when read in conjunction with the following description, drawing figures, and appended claims.

The foregoing has outlined broadly the more important features of the invention to better understand the detailed description that follows, and to better understand the contributions to the art. The refinishing tool is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the refinishing tool, which is measured by the claims, nor intended to limit the scope of the claims. The novel features of the refinishing tool are best understood from the accompanying drawing, considered in connection with the accompanying description of the drawing, in which similar reference characters refer to similar parts, and in which:

Figure 1:
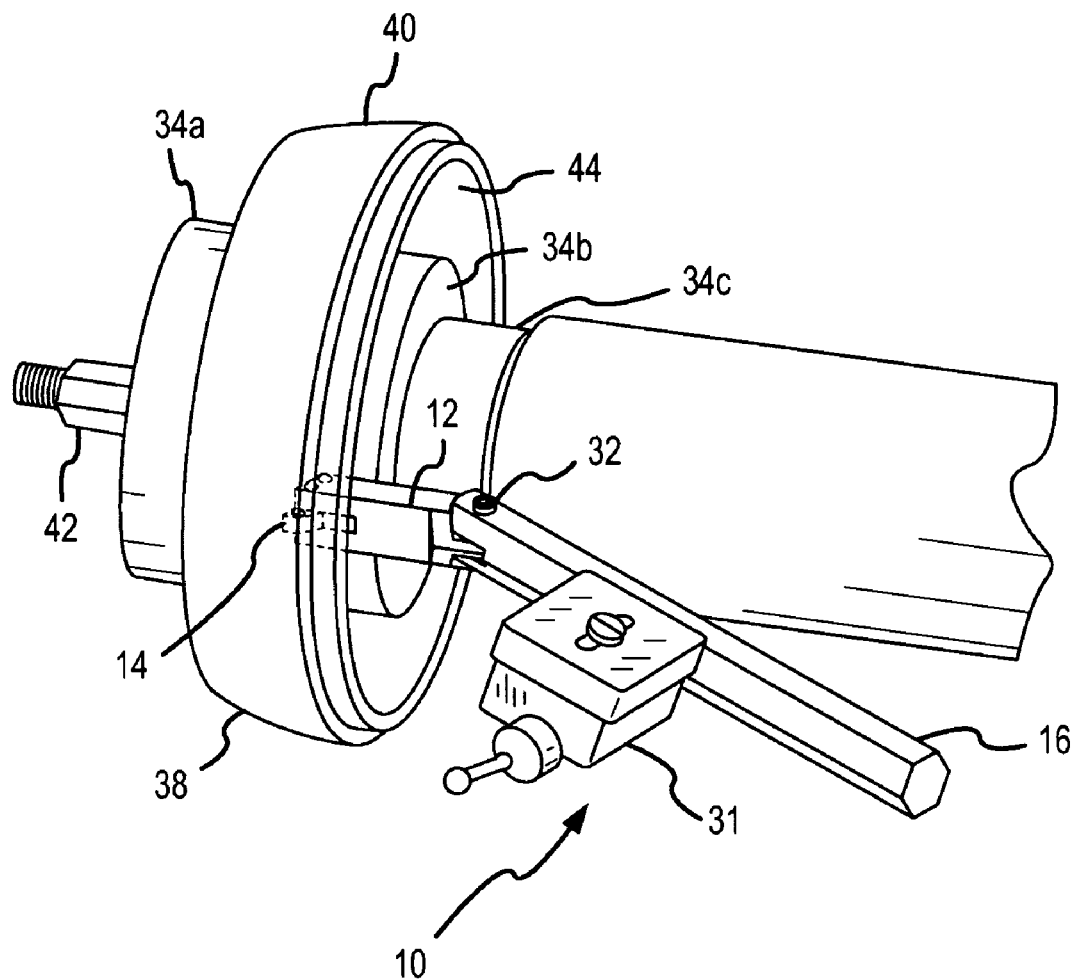
FIG. 1 is a perspective view of the refinishing tool in an operative environment extending into a brake drum that is mounted on a brake lathe, also showing a keeper.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

Claim elements and steps in this document have been numbered solely as an aid in understanding the description. The numbering is not intended to, and should not be considered as intending to, indicate the ordering of elements and steps in the claims. In addition, the refinishing tool shown in drawing FIGS. 1 through 7B shows at least one embodiment that is not intended to be exclusive, but merely illustrative of the disclosed embodiments.

DETAILED DESCRIPTION

Briefly, in one embodiment of the refinishing tool as shown by cross-reference between FIGS. 1 through 7B, the refinishing tool 10 in its broadest aspect includes a swivel member 12 on which a cutter 14 is removably mountable. Swivel member 12 is positionable on an arm 16 and repositionable in relationship to the longitudinal axis of arm 16 as perhaps best shown by cross-reference between FIGS. 4A and 4B.

Figure 3:
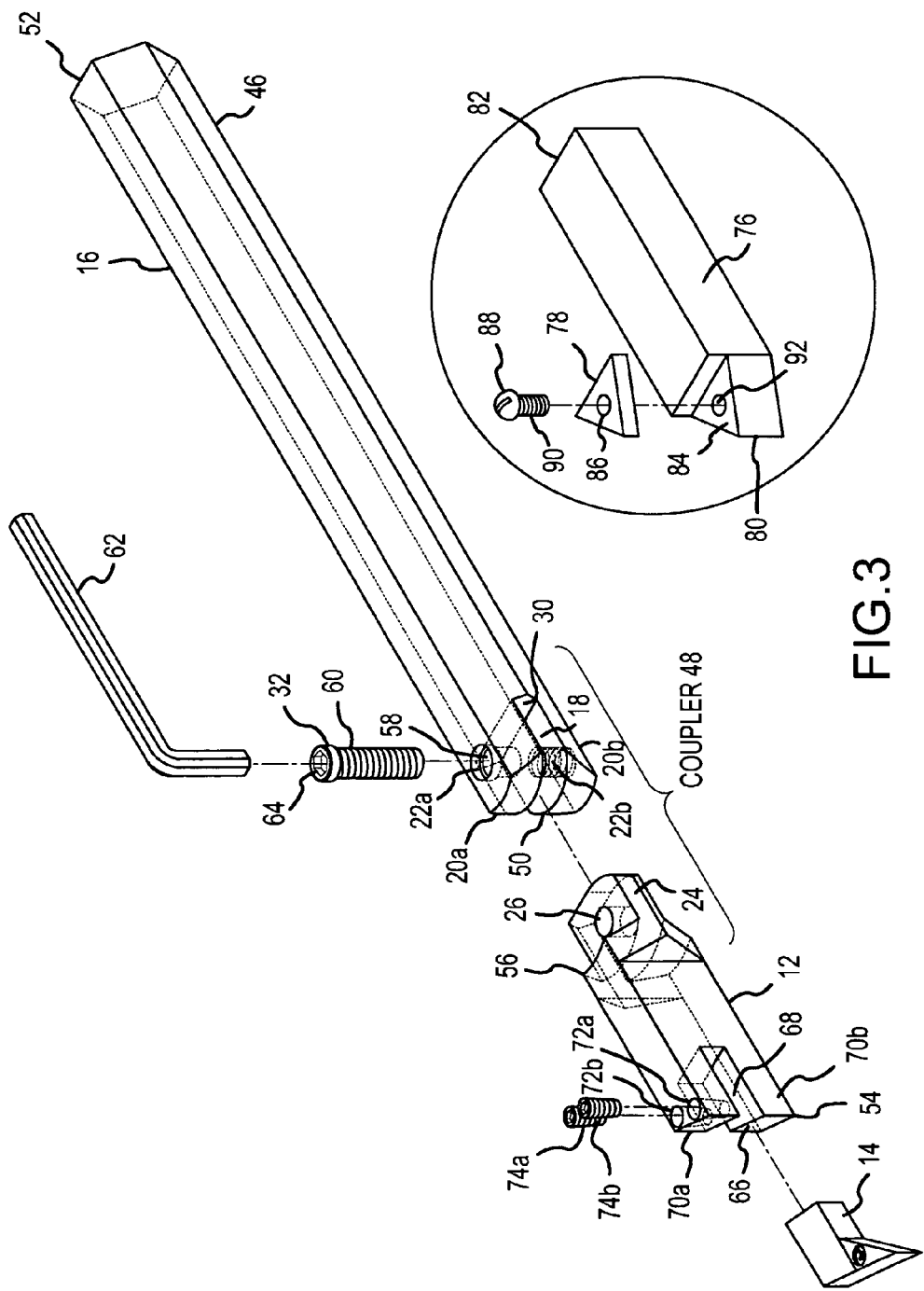
FIG. 3 is an exploded perspective view of components of one embodiment of the refinishing tool.
Figure 4A:
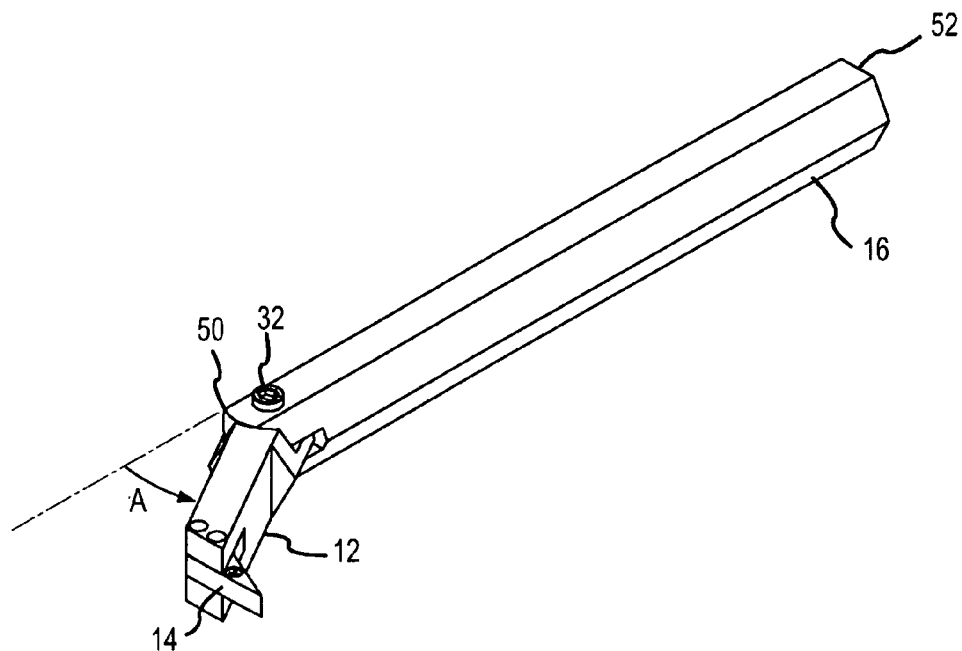
FIGS. 4A and 4B are perspective views of the refinishing tool showing the various angles of attitude and position provided by the swivel member.
Figure 4A:
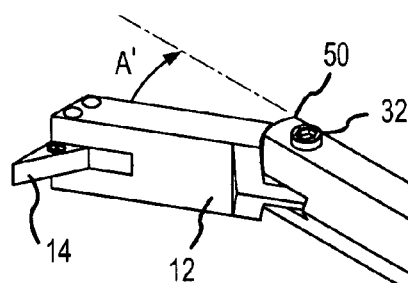
Figure 4B:
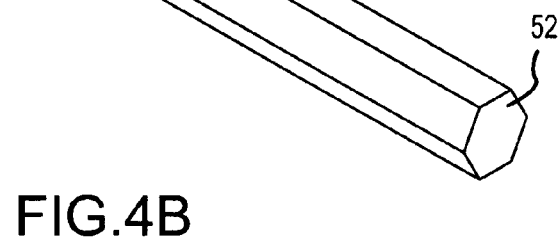

A coupler 48, as perhaps best shown in FIG. 3, is provided to demountably connect arm 16 to swivel member 12. As used in this document, the term "coupler" includes in one embodiment (i) a slot 18 and two opposing arm extensions 20a,b formed in one end of arm 16, (ii) opposing bores 22a,b formed through two arm extensions 20a,b, and (iii) a tongue 24 formed in one end of swivel member 12 that is removably mountable in slot 18. A hole 26 is formed in tongue 24. A partially beveled edge 28 is formed in tongue 24, and is perhaps best shown by cross-reference between FIGS. 5A,5B and 7A-7B. Partially beveled edge 28 is positioned in slot 18 to enable partially beveled edge 28 to make contact with the back surface 30 of slot 18, thus contributing to the capability of locking swivel member 12 and cutter 14 in desired positions and attitudes during operation.

During operation of refinishing tool 10, a craftsman may adjust swivel member 12 in any acute angle formed in relationship to the longitudinal axis through arm 16 varying from zero degrees through approximately 45 degrees. A connector 32 is provided for rotatable insertion through bores 22a,b and hole 26 for rotatable and removable connection of swivel member 12 and arm 16. Cutter 14 is removably connectable to the other end of swivel member 12. As shown by cross-reference between FIGS. 1 and 2, any of a variety of keepers 31 may be used to removably mount refinishing tool 10 adjacent to brake lathe adapter system 34 and arbor 36 to enable a craftsman to perform refinishing work with refinishing tool 10 on workpiece 38, such as a brake 40 held on arbor 36 by arbor nut 42 to refinish inner surface 44 of brake 40.

Figure 2:
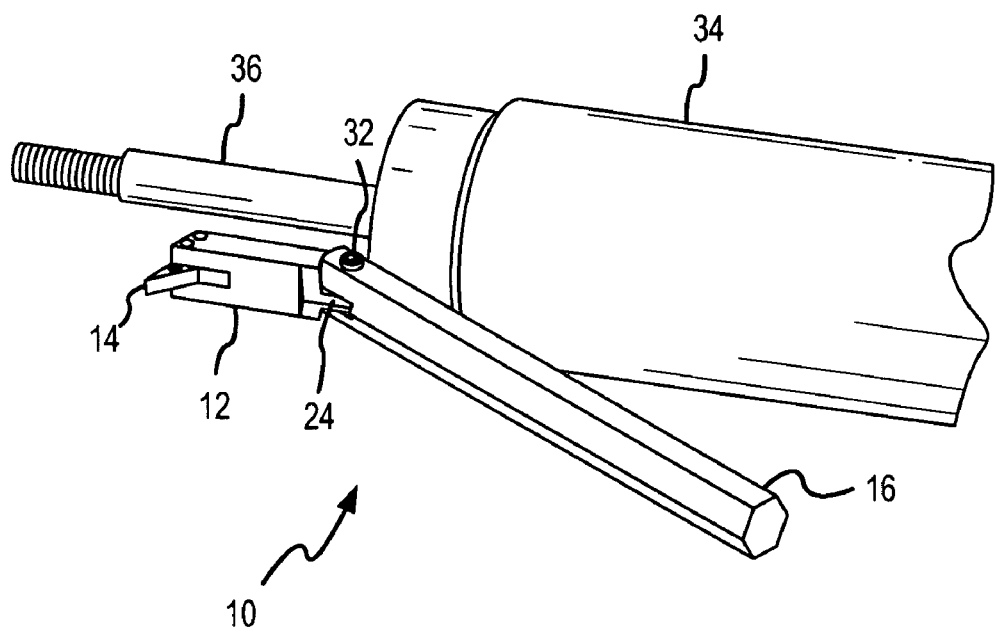
FIG. 2 is a perspective view of the refinishing tool in an operative environment beside a brake lathe with the brake drum removed.

More specifically, referring by cross-reference between FIGS. 1-2, refinishing tool 10 is shown in an operative environment positioned for operation in relationship to a brake lathe adapter system 34a-b mounted on a rotatable arbor 36 to which a workpiece 38 such as a brake 40 has been fixed for refinishing by securing brake 40 with an arbor nut 42. Exemplary embodiments of brake lathe adapter system and of arbor nut 42 by the same sole inventor of refinishing tool 10 disclosed in this document are shown respectively in U.S. Pat. No. 6,279,919 B1, issued Aug. 28, 2001, U.S. Pat. No. 6,554,291 B1 issued Apr. 29, 2003, and U.S. Pat. No. 6,631,660 B1 issued Oct. 14, 2003. As shown in FIG. 1, brake 40 generally includes an inner surface 44. Cutter 14 is shown in contact with inner surface 44 of brake 40.

As shown in FIG. 2, a craftsman using refinishing tool 10 may position swivel member 12, and therefore cutter 14, in a wide variety of positions and attitudes for refinishing work in relationship to the fixed rotation of arbor 36 and brake drum 40 during operation.

Figure 7A:
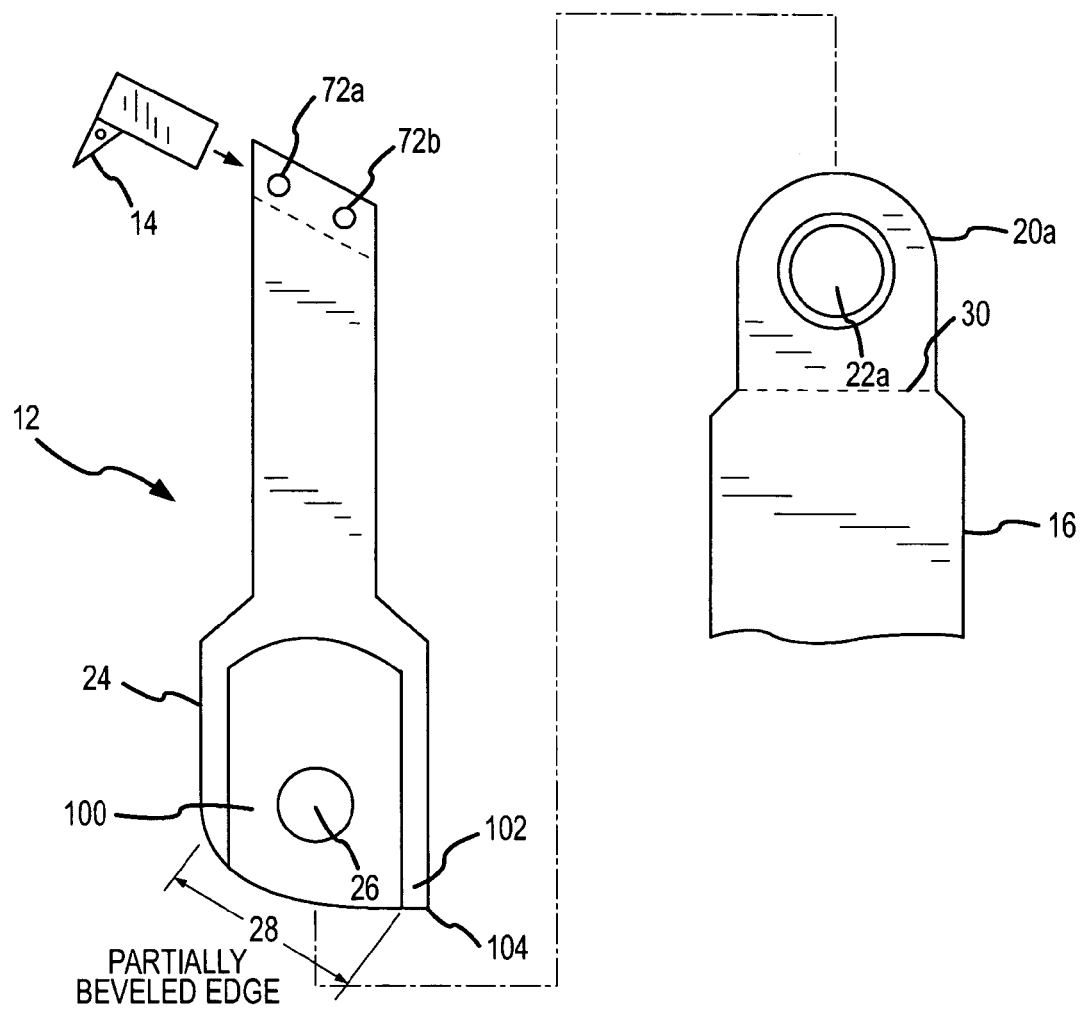
FIGS. 7A-7B show a top view of the swivel member and one end of the arm.
Figure 7B:
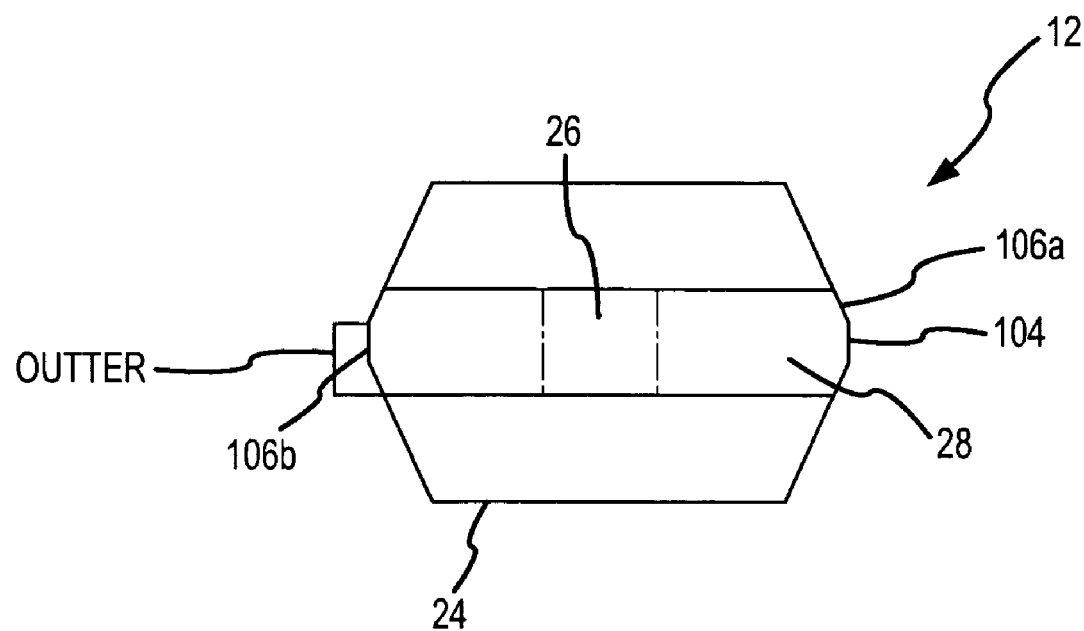

More specifically, the swivel member 12 of shaping tool 10 includes partially beveled edge 28 of tongue 24 to form an asymmetrical shoulder 100 as shown best in FIG. 7A. Asymmetrical shoulder 100 is adapted to compressively fix the fin 102 formed in asymmetrical shoulder 100 rigidly against back surface 30 of slot 18. As shown, fin 102 is formed by the intersection 104 of partially beveled edge 28 and only one of opposing sides 106a,b of tongue 24 which, as shown by cross-reference between FIGS. 3, 5A-5B, and 7A-7B, is identified as opposing side 106a. Thus, when swivel member 12 is extended in a fixed linear alignment coincident with the longitudinal axis through the arm 16, the intersection 104 is rigidly fixed against back surface 30 of slot 18, and that portion of tongue 24 formed as fin 102 likewise is lodged firmly against back surface 30 of slot 18. The rigid position is also held in place by connector 32 which may be threadably tightened as described subsequently in this document. The rigid fixation of asymmetrical shoulder 100 adjacent back surface 30 is useful in many refinishing operations where no angular displacement of the swivel member 12 from the longitudinal axis through arm 16 and swivel member 12 is desired or necessary. Thus, the fact that asymmetrical shoulder 100 can be locked in position adjacent back surface 30 is useful in reducing vibrations and movement of the shaping tooth 78, thus producing, for example, a better refinished surface on larger brake drums.

Asymmetrical shoulder 100 is also useful in rotatably orienting swivel member 12 from a longitudinal axis through arm 16 in an angular position within a continuous range between zero degrees and forty-five degrees in one direction from the fixed linear alignment discussed above. As shown by cross-reference between FIGS. 3, 4A-4B, 5A-5B, and 7A-7B, partially beveled edge 28 of tongue 24 of swivel member 12 may be rotatably positioned in any position between zero degrees and forty-five degrees in one direction from the longitudinal axis through arm 16, and is perhaps best shown as Angle A and Angle A' in FIGS. 4A and 4B. Swivel member 12 is not limited to one or more fixed positions between zero degrees and forty-five degrees. Swivel member 12 is not limited to positions by a ratchet, indexing recesses, or any mechanism or device that restricts angular alignment of swivel member 12 to predetermined positions. Rather, swivel member 12 may be positioned at any position desired by the craftsman to best accomplish a refinishing operation within the zero degrees and forty-five degrees limitation. The fine-tuning of the positioning of the swivel member 12 within the angular displacement allows a craftsman to achieve superior refinishing of a brake 40.

As shown perhaps best in FIG. 3, additional rigidity of cutter 14 is achieved by removably inserting cutter 14 within the groove 68 formed by two opposing monolithic flanges 70 of swivel member 12, rather than to merely mount cutter 68 on a single platform, as will be evident to a person skilled in the art.

FIG. 3 shows an exploded perspective view of components of one embodiment of refinishing tool 10. As shown, arm 16 is a generally elongated body 46. Arm 16 is shown to be hexagonal in cross-sectional shape for greater ease of handling and mounting by a craftsman conducting the refinishing work. As will be evident to one skilled in the art, however, the cross-sectional shape of arm 16 is not a limitation of refinishing tool 10.

As shown in FIG. 3, refinishing tool 10 also includes coupler 48. Also as shown, arm 16 includes a distal end 50 and a proximal end 52. Swivel member 12 includes a leading end 54 and a trailing end 56. Coupler 48 is useful for removably and rotatably connecting arm 16 and swivel member 12. Coupler 48, in one embodiment of refinishing tool 10, includes opposing arm extensions 20a,b monolithically formed in distal end 50 of arm 16. Slot 18 is formed between opposing arm extensions 20a,b. Back surface 30 of slot 18 also is shown by cross-reference between FIGS. 3, 5A, and 5B. Opposing bore 22b is shown formed with threads 58 matably engageable with threads 60 formed on connector 32.

Coupler 48 also includes tongue 24 that monolithically extends from trailing end 56 of swivel member 12. Hole 26 is formed through tongue 24 to be dimensionally comparable to opposing bores 22a,b, and positioned a distance from trailing end 56 of tongue 24 so that a longitudinal axis would extend through opposing bores 22a,b and hole 26 to allow threadable insertion of connector 32 through opposing bore 22a, hole 26, and into opposing bore 22b for adjusting the acute angle A as best shown by cross-reference with FIGS. 4A and 4B that may be formed between swivel member 12 and arm 16 by rotating swivel member 12 in relationship to connector 32.

A craftsman also may adjust and temporarily fix in any desired position acute angle A during refinishing work by using key 62 as perhaps best shown in FIG. 3. Key 62 may be inserted into recess 64 of connector 32 to loosen or tighten treaded connections such as threads 60. As shown, partially beveled edge 28 of tongue 24 of swivel member 12 may be rotatably positioned in any position between zero degrees and forty-five degrees in one direction from the longitudinal axis through arm 16.

Figure 5A:
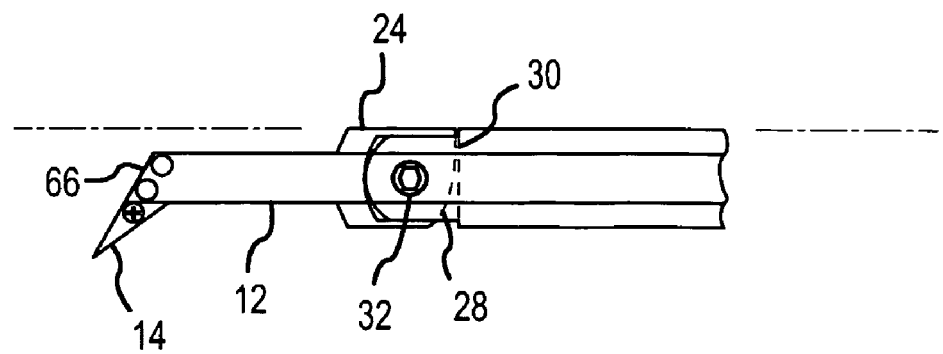
FIGS. 5A and 5B are top plan views of the refinishing tool showing the various angles of attitude and position provided by the swivel member, and the effect of the partially beveled edge of the tongue.
Figure 5B:
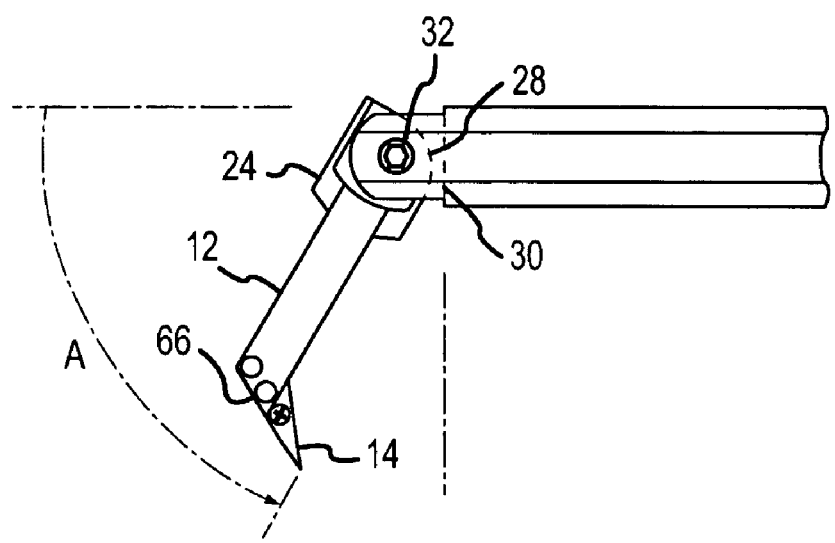

As also shown by cross-reference between FIGS. 3, 5A, and 5B, tongue 24 includes partially beveled edge 28. Partially beveled edge 28 allows movement of swivel member 12 around connector 32 through acute angle A. In at least one embodiment of refinishing tool 10, a craftsman may vary acute angle A from zero degrees to 45 degrees. Partially beveled edge 28 also engages back surface 30 in slot 18 of arm 16, as perhaps best shown by cross-reference between FIGS. 5A and 5B. Engaging back surface 30 impedes further rotational movement of swivel member 12 around a longitudinal axis through connector 32, thus contributing to allowing a craftsman to select the desired attitude of cutter 14 in relationship to inner surface 44 of brake drum 40, while also allowing access into brake drum 40.

In one aspect and embodiment of refinishing tool 10, swivel member 12 is formed of a cross-sectional configuration of a hexagon to provide ease of handling and mounting for a craftsman. However, to decrease the overall dimensions of swivel member 12 to enhance the capability of allowing a craftsman greater access with refinishing tool 10 to smaller and smaller brake drums 40, a substantially triangular section (not shown) is removed from leading end 54 of swivel member 12 exposing an angular flat surface 66 on leading end 54. As also shown in FIG. 3, a groove 68 is formed monolithically in angular flat surface 66 to provide two opposing monolithic flanges 70a,b. Opposing threaded passages 72a,b are formed in the two opposing monolithic flanges 70a,b. Threaded rods 74a,b are provided for threadable engagement with opposing threaded passages 72a,b formed in opposing monolithic flanges 70a,b. As shown perhaps best in FIG. 3, additional rigidity of cutter 14 is achieved by removably inserting cutter 14 within the groove 68 formed by two opposing monolithic flanges 70 of swivel member 12, rather than to merely mount cutter 68 on a single platform, as will be evident to a person skilled in the art.

Refinishing tool 10 also includes cutter 14, as best shown by cross-reference between FIGS. 3, 5a, and 5b. Cutter 14, in one aspect and embodiment of refinishing tool 10, includes a substrate 76 and what is generally referred to in the industry as an "insert" but is identified in this document as a refinishing tooth 78. Cutter 14 is detachably mountable on leading end 54 of swivel member 12 in groove 68 formed in angular flat surface 66. Substrate 76 is configured from a metal stock to have a fore end 80 and an aft end 82. Fore end 80 of substrate 76 is shaped to be substantially triangular.

A ledge 84 is provided in fore end 80. Refinishing tooth 78, configured from metal stock, in one embodiment of refinishing tool 10, is substantially triangular in shape, but as a person skilled in the art will recognize, the shape is not a limitation of cutter 14. A hollow duct 86 is formed through refinishing tooth 78. A threaded device 88, such as a screw 90, is included to secure refinishing tooth 78 into threaded orifice 92 in ledge 84 of substrate 76 and to permit removal of refinishing tooth 78 from ledge 84 of substrate 76. Substrate 76 and refinishing tooth 78 may be shaped and configured to smaller than conventional dimensions to assist a craftsman using refinishing tool 10 both to access to inner surface 44 of brake drum 40, and to adjust refinishing tool 10 to achieve the proper attitude of cutter 14 during operation.

Figure 6:
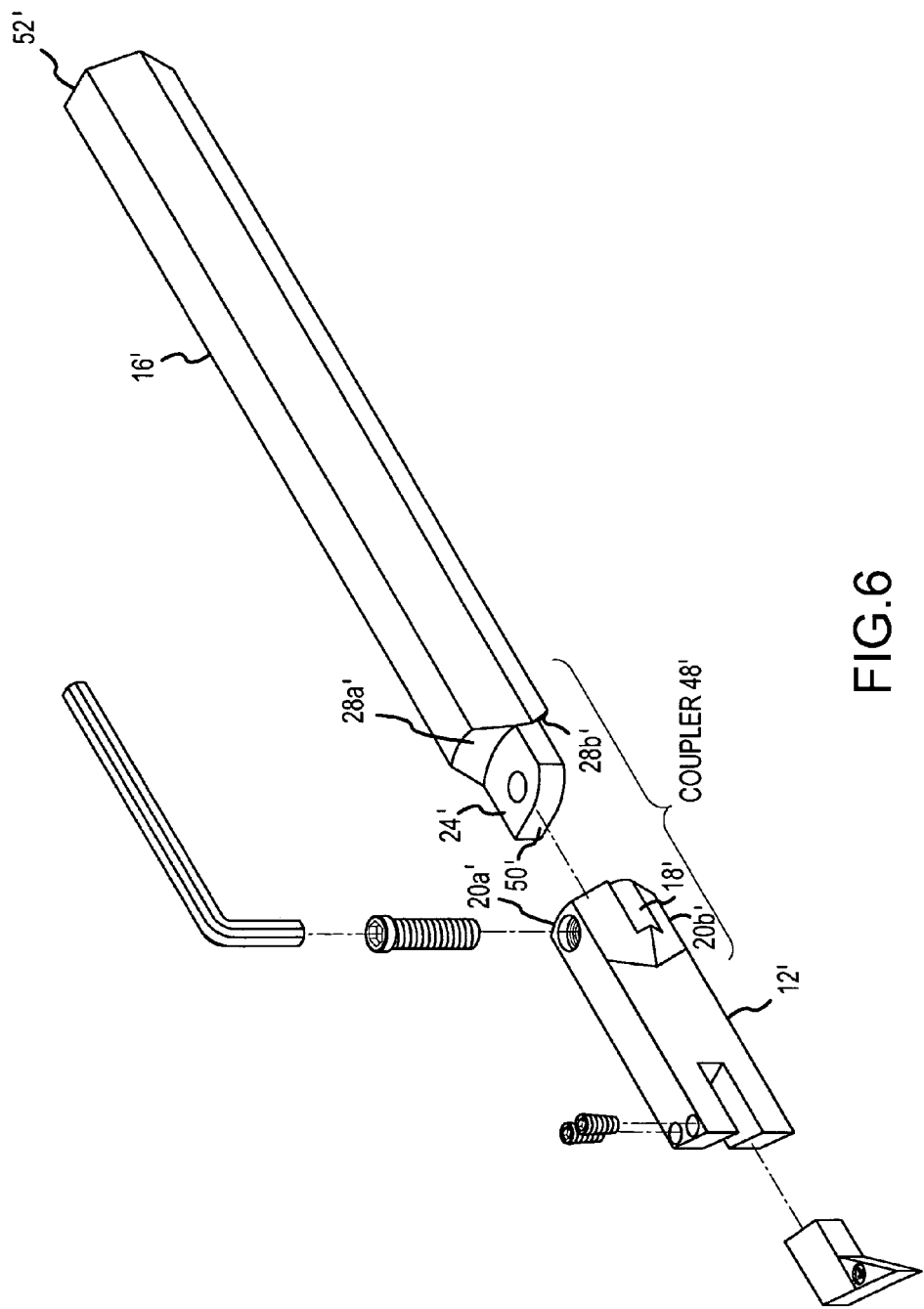
FIG. 6 shows an alternative embodiment of the coupler of the refinishing tool.

Another embodiment of coupler 48 of refinishing tool 10 is shown in FIG. 6 as coupler 48'. Coupler 48' is shown to include a swivel member 12' formed with a slot 18' between monolithic extensions 20a',b' in one end of swivel member 12'. Each of monolithic extensions 20a',b' in one end of swivel member 12' is formed with a partially beveled edge 28a',b' for helping to restrict movement of swivel member 12' during operation for refinishing work. Also shown in FIG. 6 is an arm 16'. Arm 16' is formed with a proximal end 52' and a distal end 50'. Distal end 50' also includes a tongue 24'. Tongue 24' is removably insertable into slot 18'.

While the refinishing tool shown in drawing FIGS. 1 through 7B include two embodiments of the refinishing tool, the description is intended to be neither exclusive nor limitations. This disclosure is merely illustrative of the presently preferred embodiments of refinishing tool 10. Claim elements and steps in this document have been numbered solely as an aid in readability and understanding. The numbering is not intended to, and should not be considered as, indicating the ordering or sequencing of elements and steps in the claims.

What is claimed is:

1. A tool for refinishing a rotating workpiece, comprising:
   an arm adapted to grasp the refinishing tool during a workpiece refinishing operation;
   a swivel member pivotally mountable on the arm and formed with an asymmetrical shoulder adapted to compressively rigidly fix the swivel member and arm in a fixed linear alignment coincident with a longitudinal axis through the arm and swivel member,
      wherein the asymmetrical shoulder is further adapted to rotatably orient the swivel member in any angular position within a continuous range between zero degrees and forty-five degrees in one direction only from the fixed linear alignment;

a coupler formed in the arm and the swivel member adapted to removably connect the swivel member and the arm;

a plurality of demountable locking devices for variably positioning the swivel member in relation to the arm; and a cutter detachably mountable on the swivel member within two opposing monolithic flanges adapted to provide additional rigidity during refinishing of the rotating workpiece on a lathe.

2. A refinishing tool as recited in claim 1, wherein the coupler includes at least two arm extensions monolithically formed in one end of the arm, and a slot between the two arm extensions.

3. A refinishing tool as recited in claim 1, wherein the coupler includes at least one tongue monolithically formed in one end of the swivel member adapted for forming the asymmetrical shoulder.

4. A refinishing tool as recited in claim 3, wherein the plurality of demountable locking devices includes the beveled edge formed in the tongue.

5. A refinishing tool as recited in claim 1, wherein the coupler includes opposing bores formed in the at least two arm extensions and a corresponding hole through the at least one tongue.

6. A refinishing tool as recited in claim 5, wherein the plurality of demountable locking devices includes a connector removably insertable in the opposing bores and the corresponding hole.

7. A refinishing tool as recited in claim 6, wherein the plurality of demountable locking devices includes a key for adjustably fixing the connector into a desired position.

8. A refinishing tool as recited in claim 1, wherein the cutter further comprises a substrate to which a refinishing tooth is removably mountable.

9. A refinishing tool as recited in claim 8, wherein the substrate and refinishing tooth may be variably dimensionable.

10. A refinishing tool as recited in claim 1, wherein the plurality of demountable locking devices further comprises a keeper to position the refinishing tool during operation.

11. A repositionable tool for refinishing a rotating workpiece, comprising:

an arm formed with a slot and a plurality of bar extensions in one end of the arm, the slot having a planar back surface;

a swivel member monolithically formed with a tongue is rotatably insertable into the slot, wherein the tongue includes an asymmetrical shoulder and a planar fin adapted, when the planar fin is lodged against the planar back surface of the slot, to fix the swivel member and arm in linear alignment coincident with a longitudinal axis through the arm and the swivel member while refinishing the rotating workpiece;

a partially beveled edge formed in the tongue adapted to allow angular movement of the swivel member in a range of zero to forty-five degrees in one direction only from the longitudinal axis through the arm and swivel member;

a cutter detachably mountable on the leading end of the swivel member; and means for removably and rotatably mounting the swivel member in the slot.

12. A repositionable tool for refinishing a rotating workpiece as recited in claim 11, wherein opposing bores are formed in the plurality of bar extensions.

13. A repositionable tool for refinishing a rotating workpiece as recited in claim 12, wherein at least one corresponding hole is formed in the tongue substantially dimensionally equivalent to the opposing bores in the plurality of bar extensions.

14. A repositionable tool for refinishing a rotating workpiece as recited in claim 13, wherein the at least one corresponding hole and at least one of the opposing bores are formed with threads.

15. A repositionable tool for refinishing a rotating workpiece as recited in claim 14, wherein the cutter includes a substrate.

16. A repositionable tool for refinishing a rotating workpiece as recited in claim 15, wherein the cutter includes a refinishing tooth removably mountable on the substrate.

17. A repositionable tool for refinishing a rotating workpiece as recited in claim 16, wherein the swivel member mounting means includes a connector threadably insertable in the opposing bores formed in the plurality of bar extensions and in the at least one corresponding hole formed in the tongue.

18. A variable angle tool for refinishing a rotating workpiece, comprising:

a swivel member formed with a slot having a planar back surface between at least two extensions in one end,
and further wherein the at least two extensions include partially beveled edges for restricting movement of the swivel member;

an arm formed with a proximal end and a distal end,
wherein the distal end further comprises a tongue for rotatable insertion into the slot, the tongue having a planar fin lodgeable against the back surface of the slot to fix the swivel member and arm in linear alignment coincident with a longitudinal axis through the arm and the swivel member;

a cutter detachably mountable on the leading end of the swivel member; and means for removably and rotatably mounting the swivel member in the slot.

19. A method for refinishing a rotatable workpiece, comprising the steps of:

mounting the workpiece on a rotatable shaft;

providing a refinishing tool that includes an arm, and defining in an end of the arm a slot having a planar back;

refinishing a swivel member to provide the swivel member with a tongue having a planar fin lodgeable against the slot's planar back for coupling the swivel member to the end of the arm and for restricting movement of the swivel member and cutter during refinishing of the rotatable workpiece;

mounting a cutter on the swivel member;

attaching the refinishing tool adjacent the rotatable shaft;

positioning the cutter against the rotatable workpiece; and refinishing the rotatable workpiece.

20. A method for refinishing a rotatable workpiece as recited in claim 19, wherein the workpiece mounting step includes the substeps of:

selecting a brake lathe adapter system for securing the workpiece on a rotatable shaft;

choosing a workpiece to be shaped; and securing the workpiece on the rotatable shaft.

21. A method for refinishing a rotatable workpiece as recited in claim 20, wherein the refinishing tool providing step includes the substeps of:

forming from metal stock an arm having a cross-sectional configuration of a hexagon to provide ease of handling for a craftsman;

refinishing the end of the arm to form the slot between two monolithic arm extensions;

removing a hollow bore from each of the two arm extensions; and forming threads within at least one of the hollow bores.

22. A method for refinishing a rotatable workpiece as recited in claim 20, wherein the swivel member refinishing step includes the substeps of:

choosing metal stock from which to form the swivel member having a leading end, a trailing end, and a cross-sectional configuration of a hexagon to provide ease of handling for a craftsman;

forming a hole through the tongue;

removing a slab from opposing sides of the swivel member;

removing from the leading end a substantially triangular section to form an angular flat surface on the leading end;

forming a groove in the angular flat surface to provide at least two opposing monolithic flanges; and forming at least one threaded passage through one or more of the two opposing monolithic flanges.

23. A method for refinishing a rotatable workpiece as recited in claim 20, wherein the cutter mounting step includes the substeps of:

configuring from metal stock a substrate;

refinishing an end of the substrate to be substantially triangular;

creating a ledge in the substantially triangular end of the substrate;

forming from metal stock a refinishing tooth;

forming a hollow duct through the refinishing tooth;

providing a threaded device for attaching the refinishing tooth to the substrate by inserting the threaded device through the hollow duct.

24. A method for refinishing a rotatable workpiece as recited in claim 20, wherein the restricting movement including means includes the substeps of:

refinishing the trailing end of the swivel member to form a monolithic tongue having an edge;

beveling a portion of the edge of the tongue to restrict movement of the swivel member during use;

providing an adjustable connector for insertion through the opposing bores and the hole;

using a key to adjust the connector; and inserting a removable threaded rod into the at least one threaded passage through the one or more of the two opposing monolithic flanges for compressible contact against the substrate.

* * * * *